United States Patent [19]
Devarakonda et al.

[11] Patent Number: 6,115,736
[45] Date of Patent: Sep. 5, 2000

[54] SYSTEM AND METHOD FOR AUTOMATICALLY LOCALIZING ACCESS TO REMOTE NETWORK COMPONENTS USING IMPLICIT AGENT RELOCATION

[75] Inventors: Murthy V. Devarakonda; Ajay Mohindra, both of Yorktown Heights; Apratim Purakayastha, Elmsford; Deborra Jean Zukowski, Yorktown Heights, all of N.Y.

[73] Assignee: International Business Machines Corporation, Armonk, N.Y.

[21] Appl. No.: 09/065,201

[22] Filed: Apr. 23, 1998

Related U.S. Application Data

[62] Division of application No. 08/847,079, May 1, 1997, Pat. No. 6,055,562.

[51] Int. Cl.[7] .................................................. G06F 13/00
[52] U.S. Cl. .................................................... 709/202
[58] Field of Search ................................. 345/339, 329, 345/338, 963, 968; 707/10; 709/100, 101, 105, 200, 210, 201, 202, 203, 204, 303, 212

[56] References Cited

U.S. PATENT DOCUMENTS 5,603,031  2/1997  White et al. ............................ 709/303
5,963,944  10/1999  Adams .................................... 709/202

OTHER PUBLICATIONS

"A Language with Distributed Scope", L. Cardelli, Digital Equipment Corp., Systems Research Center, May 30, 1995, pp. 1–15.

"Itinerant Agents for Mobile Computing", Chess et al., IBM Research Div., Research Report, RC–20010, Feb. 22, 1995, pp. 1–29.

"Mobile Agents with Java: The Aglet API", Lange et al., 1998, pp. 1–18.

Primary Examiner—Robert B. Harrell
Attorney, Agent, or Firm—David M. Shofi

[57] ABSTRACT

A system and method of implicitly localizing agent access to a network component located on a remote host includes the steps of determining a host location of the network component; automatically relocating an agent to the remote host; and incorporating the agent into an address space shared by the network component. The agent is preferably a script.

16 Claims, 4 Drawing Sheets

```
dim nodelist(2)
nodelist(0) = "machineA"
nodelist(1) = "machineB"
```
202a  
```
compA = createComponent("IHelloWorld", null) at nodelist(0)
compB = createComponent("IHelloWorld", null) at nodelist(1)
```
202b

⎱ 200

```
compA.displayMessage("I am at machine A")
compB.displayMessage("I am at machine B")
```
⎱ 204

Fig. 2

SYSTEM AND METHOD FOR AUTOMATICALLY LOCALIZING ACCESS TO REMOTE NETWORK COMPONENTS USING IMPLICIT AGENT RELOCATION

CROSS REFERENCE TO RELATED APPLICATIONS

This is a continuation-in-part of U.S. patent application Ser. No. 08/847,079 entitled, "DYNAMIC MOBILE AGENTS," filed May 1, 1997, now U.S. Pat. No. 6,055,562.

FIELD OF THE INVENTION

The present invention is related to the dynamic routing of mobile agents. More specifically, the present invention is related to automatically localizing access to network components using implicit program relocation.

BACKGROUND

A mobile agent can be written as a program that executes on a set of network hosts. The agent visits the network hosts to execute parts of its program. The agent may need, for example, to access information located on a given network host or there may be some preference to execute parts of its program on various network hosts.

In prior art systems, the sequence of hosts that the agent visits is statically pre-configured when an agent program is written. Furthermore, the agent in these systems must execute an explicit instruction to move to another remote network host. For example, U.S. Pat. No. 5,603,031, issued Feb. 11, 1997, entitled "System and Method for Distributed Computation Based Upon the Movement, Execution, and Interaction of Processes in a Network," by White et al., describes a method for statically pre-configuring an agent's itinerary in a destination list composed of destination objects. Each destination object has a telename and a teleaddress preassigned to specific regions of the network. In the system disclosed in White et al., an agent must execute a "go" statement to move to another network host to access resources located at that host.

There are many other examples of this explicit agent relocation requirement. In Lange et. al., *IBM Aglets Workbench—Programming Mobile Agents in Java*, Proceedings of 1997 World Wide Computing and Its Applications, Japan, pp. 253–266, the authors suggest that an agent execute the "dispatch" statement to move to another network host. In Cardelli, *A Language with Distributed Scope*, Computing Systems, Vol. 8, No. 1, Winter 1995, pp. 27–59, Cardelli describes a system wherein object migration is achieved by explicitly copying the object (agent) state. Finally, in Chess et al., *Itinerant Agents for Mobile Computing*, available as IBM Research Report RC-20010, the authors state the need for explicit primitives and mobility support to make an agent move to another network host.

Systems that require this explicit agent relocation suffer from increased programming complexity because the programmer must be aware of the location where a particular piece of code would execute. As a result, the application code has to be organized into location-sensitive blocks with explicit instructions for agent relocation demarcating the blocks. Location awareness distracts the programmer from focusing solely on developing application logic. This reduces programmer productivity.

Thus, there is a need for a system which permits a program (agent) to execute throughout a network without the need for explicit agent relocation, thereby improving programmer productivity.

SUMMARY OF THE INVENTION

In accordance with the aforementioned needs, the present invention provides a system and method for determining the location of a network component and a set of methods to access the apparatus and then to relocate an agent transparently to the determined location.

Specifically, the present invention provides a method of implicitly localizing agent access to a network component located on a remote host, including the steps of determining a host location of the network component; automatically relocating an agent to the remote host; and incorporating the agent into an address space shared by the network component. The agent is, preferably, a script.

The automatically relocating step of the present invention preferably includes the step of relocating the agent to the remote host without any explicit instructions to do so. Furthermore, the automatically relocating step preferably includes the steps of packaging the agent for transmission and transmitting the agent to the remote host or to the matched host address.

The incorporating step of the present invention preferably includes the steps of receiving the packaged agent at the remote host; unpackaging the agent and forwarding the agent to an execution engine in the remote host.

The determining step of the present invention preferably includes the steps of identifying a component reference host name associated with a component reference host address of the network component; comparing the component reference host name to a list of host names; and matching one of the host names to the component reference host address.

Preferably, the step of identifying the network component for execution or manipulation is included. More specifically, the method can further include the steps of identifying the component reference ID in the agent; comparing the component reference ID to a list of component IDs; and matching one of the component IDs to the component reference ID for execution or manipulation.

The present invention also provides a program storage device, readable by a machine, tangibly embodying a program of instructions executable by the machine to perform the above-referenced method steps for implicitly localizing agent access to a network component.

The present invention also provides a system for implementing distributed component programming in a computer network including a plurality of host systems; a plurality of network components resident on the host systems; a plurality of agent execution systems, each managing one or more of the plurality of network components on the host systems; and a mobile agent capable of processing across the computer network without explicit instructions to traverse the host systems on the computer network, whereby the network components are implicitly accessible to clients, through the agent execution systems.

Preferably, the mobile agent is a script. Furthermore, each of the agent execution systems can be incorporated into a web server.

The network components preferably comprise one or more object classes, such as applets, servlets or Enterprise JavaBeans.

BRIEF DESCRIPTION OF THE DRAWINGS

These and other features of the present invention will become apparent from the accompanying detailed description and drawings, wherein:

FIG. 2 shows an example of an agent in accordance with the present invention;

DETAILED DESCRIPTION

Figure 1:
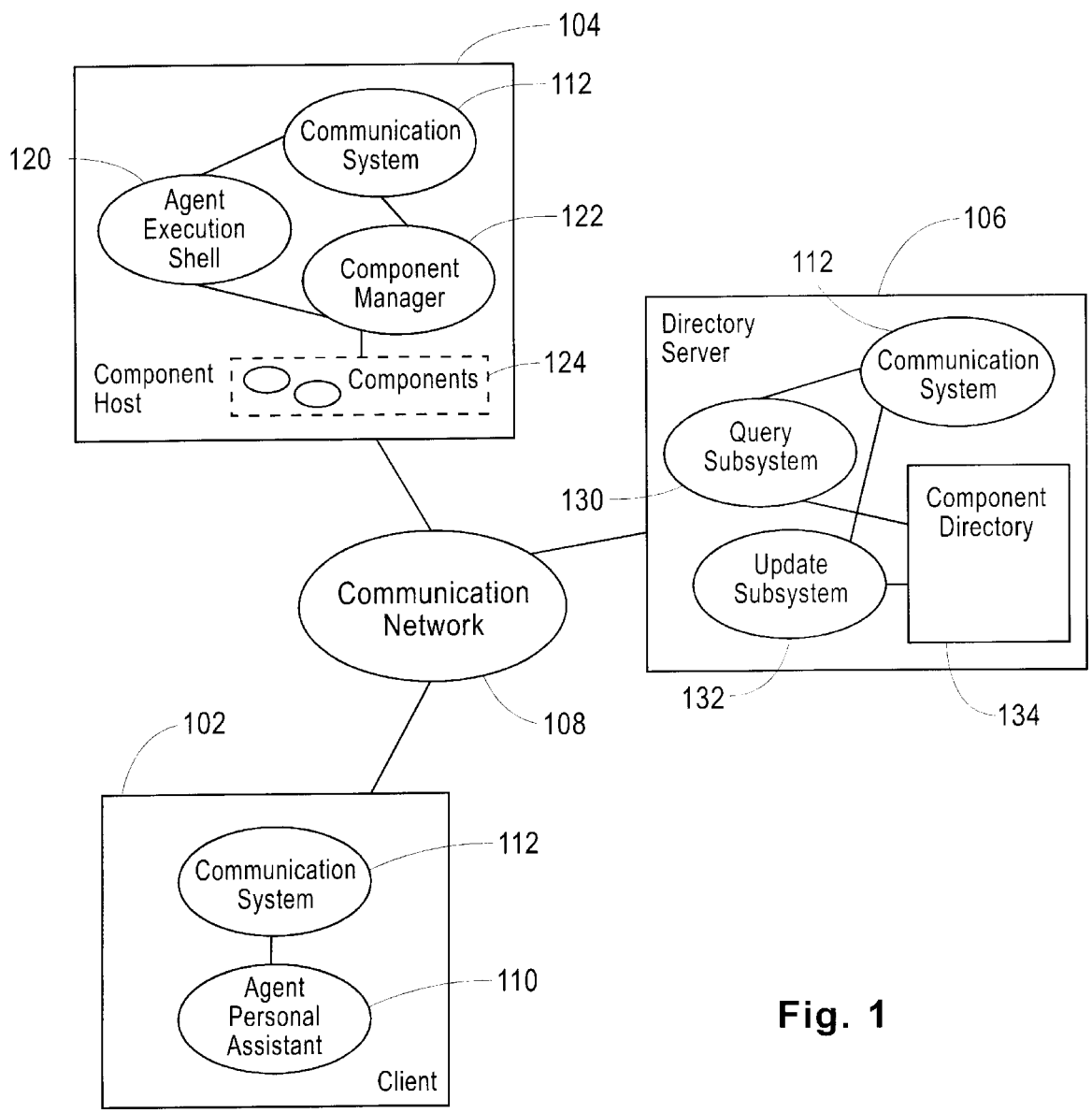
FIG. 1 shows an example of a loosely-coupled system having features of the present invention.

FIG. 1 depicts an example of a system having features of the present invention. Here, a loosely-coupled system connects computers that have distinct roles in the system. The computers 102–106, which can be running conventional operating systems such as OS/2, UNIX, AIX, or Windows NT, are interconnected by way of a communication network 108 and communication protocols. The communication protocols can be, e.g., Sun Microsystems RPC, which can run either on UDP/IP or TCP/IP. The network 108 can be of any conventional type, for example, a LAN, Internet or Intranet. The client 102 and the component host 104 can be embodied as conventional personal computers such as IBM PCs. The directory server 106 can be embodied by conventional servers such as an IBM RISC System/6000 machine. Note that the distinction between a client 102 and a component host 104 may be logical or physical. On each computer there is a conventional communication system 112, such as the TCP/IP stack in the operating system, that is used to communicate over the network.

Although a single client 102 is shown, there can be many client machines in the system. Agents are invoked on the client machines by a software subsystem called the Agent Personal Assistant (APA) 110 which is invoked each time an agent is launched on a client machine. Preferably, this subsystem is capable of debugging, updating, and monitoring (in addition to launching) agents. This subsystem is disclosed in Devarakonda et al., U.S. patent application Ser. No. 08/847,079, filed on May 1, 1997 and assigned to the assignee of the present invention, the teaching of which is incorporated herein by reference.

Although only one component host 104 is shown, there can be a plurality of component hosts in the system. The component host 104 stores a number of network components 124 that can be accessed by agent programs running on this machine. Components 124 can be one or more object classes including applets, servlets or Enterprise JavaBeans. Those skilled in the art will appreciate, however, that a component 124 can be generalized to any executable unit of code. According to the present invention, each component host includes a software subsystem called an Agent Execution Shell (AES) 120 that acts as the single coordinator for component execution by any agent. The AES is also described in Devarakonda et al.

In a preferred embodiment, the AES 120 subsystem is incorporated into a web server using the Java servlet technology. An example of a web server used with the present invention is Lotus Domino GO Webserver. The AES 120 subsystem is installed as a servlet on the web server. When a web server receives an agent execution request via the HTTP protocol, it passes the request to the AES 120 for processing.

The software system of the component host 104 also has a component manager 122 subsystem that manages the local components 124. The network set-up function of the component manager 122 is also described in Devarakonda et al.

An example of a directory server 106 used with the present invention is an LDAP compliant server such as Netscape's DIRECTORY SERVER. One skilled in the art can realize the same function using a standard database management server (DBMS) such as is sold by IBM under the trademark DB2. The directory server 106 can also be embodied by a plurality of computers cooperating together and appearing as a single directory server.

In a preferred embodiment of the present invention, the agent is a script. FIG. 2 shows an example of such a script. The script contains a prologue 200 which includes a set of special script instructions to instantiate all network components which can be implemented by the invention disclosed in Devarakonda et al. As shown, the script creates, within prologue 200, component instances, compA 202a and compB 202b, on machineA and machineB, respectively. One skilled in the art will appreciate that this prologue also can be distributed throughout the script. The script then invokes, through component invocations 204, the displayMessage() method on the two instances. Critically, the script does not include any explicit distributed programming relocation commands. The remainder of the script contains simple variable manipulation statements (not shown). The AES 120 contains a special engine to execute script commands.

Figure 3:
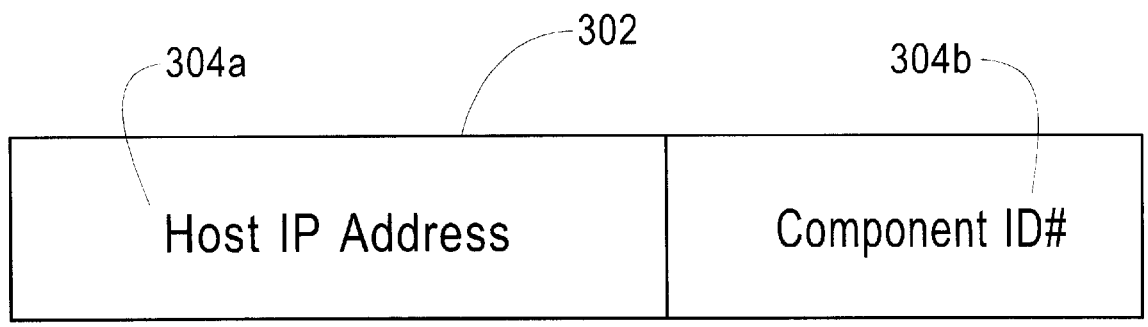
FIG. 3 shows a software subsystem runtime representation of a component reference in accordance with the present invention.

FIG. 3 shows the representation 302 of a component instance (e.g., 202a or 202b) within the AES 120, that is contained in the script. The representation 302 is comprised of two fields, the Host IP Address 304a and Component ID# 304b. The Host IP Address 304a indicates the network address for the component host 104 that manages the component. The Component ID# 304b indicates the site-specific handle used to access the component locally.

Figure 4:
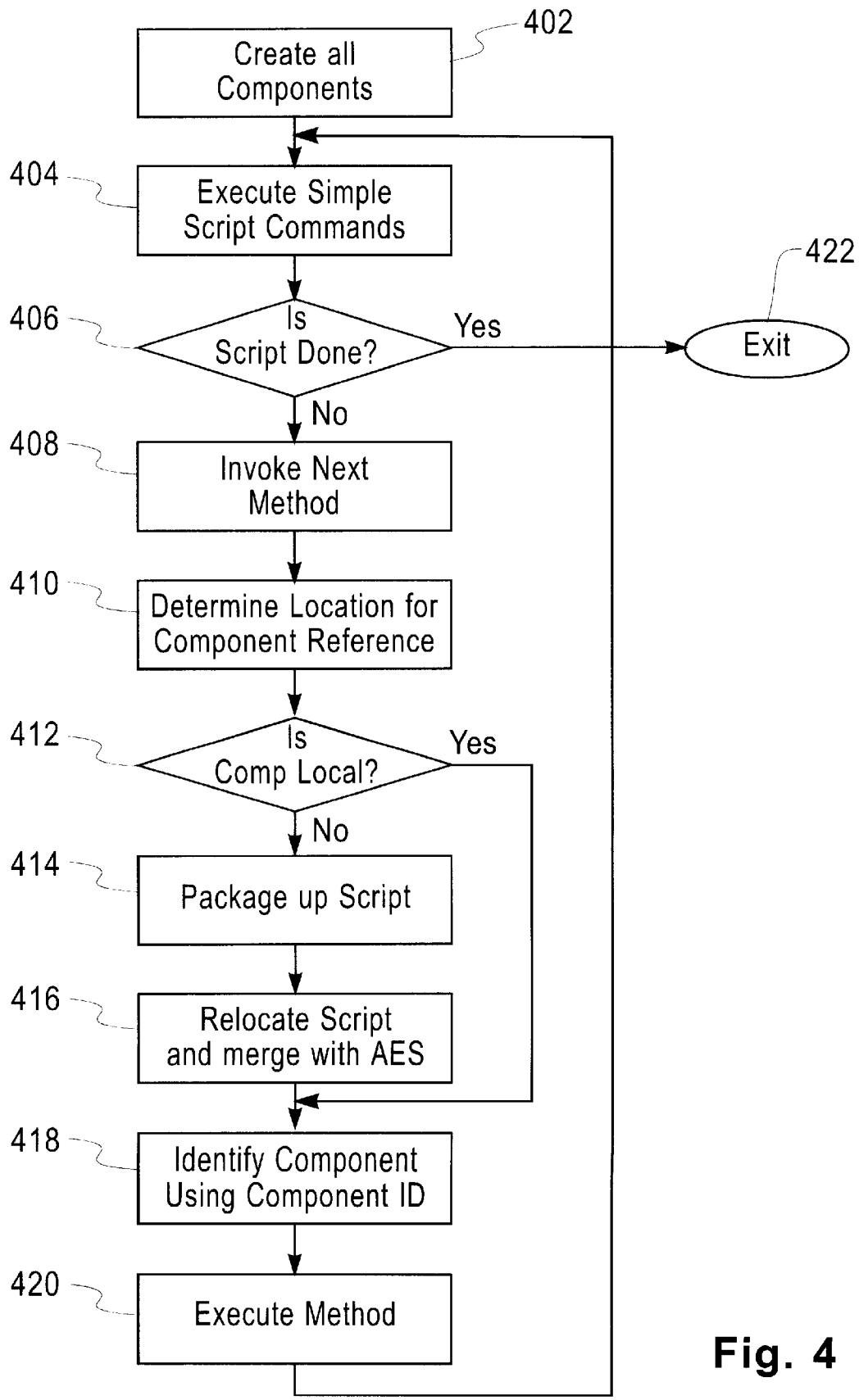
FIG. 4 shows an example of the logic for the implicit agent mobility of the present invention.

FIG. 4 shows an example of the implicit agent mobility according to the present invention. As mentioned above, the network components are, preferably, instantiated in step 402 using the methods disclosed in Devarakonda et al. After the prologue, the script execution engine in the AES 120 executes all simple script statements 404 (e.g., variable assignments). If, in step 406, the script is found to be completed, the script exits in step 422. If, however, the script is found not to be completed, the execution engine invokes a method on a network component in step 408. In step 410, the engine resolves the instance to a site using the instance's Host IP Address 304a. This resolving also can be accomplished by using a list of Host names corresponding to the addresses, rather than the addresses themselves. In step 412, the system tests whether the Host IP Address 304a matches the current host. If a match is found, the applicable component is identified in step 418, by the Component ID# 304b. This field is used to reference an internal table maintained by the AES that provides a local reference. Finally, the script execution engine uses the local reference and executes the method in step 420.

If, in step 412, the component is found to be other than local, the script is packaged up, in step 414, and sent to the address identified in step 410. In step 416, the remote AES receives the script, unpackages it, and sends it to an execution engine located in its address space. This engine then identifies the component, in step 418, and invokes the method, in step 420, similar to the above-identified local case. Thus, in accordance with the present invention, agent access to a component located on a remote host is implicitly localized, i.e. without any explicit instructions for relocation.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

We claim:

1. A method of implicitly localizing agent access to a network component located on a remote host, comprising the steps of:

hosting, in a first agent execution subsystem located in a local host, an agent;

receiving, from the agent, a method invocation instruction associated with the network component;

determining a host location of the network component by resolving the previously instantiated network component to the host location; and if the host location is determined to be local, executing the method invocation on the network component in the local host;

else relocating, from the first agent execution subsystem, the agent to the remote host without receiving any explicit relocation instructions from the agent;

wherein, in a second agent execution subsystem, the agent is incorporated into an address space shared by the network component.

2. The method of claim 1 wherein the determining step comprises the steps of:

identifying a component reference host name associated with a component reference host address of the network component;

comparing the component reference host name to a list of host names; and matching one of the host names to the component reference host name.

3. The method of claim 2 wherein the relocating step comprises the steps of:

packaging the agent for transmission; and transmitting the agent to the matched host address.

4. The method of claim 1 further comprising the step of identifying the network component for execution or manipulation.

5. The method of claim 4 further comprising the steps of:

identifying the component reference ID in the agent;

comparing the component reference ID to a list of component IDs; and matching one of the component IDs to the component reference ID for execution or manipulation.

6. The method of claim 1 further comprising the step of instantiating the network component.

7. The method of claim 1 wherein the agent is a script.

8. The method of claim 1 wherein the relocating step comprises the steps of:

packaging the agent for transmission; and transmitting the agent to the remote host.

9. The method of claim 1 further comprising the step of iterating the steps for additional network components.

10. A program storage device, readable by a machine, tangibly embodying a program of instructions executable by the machine to perform method steps for implicitly localizing agent access to a network component according to any one of the method steps of claims 1–5.

11. A system for implementing distributed component programming in a computer network comprising:

a plurality of host systems;

a plurality of network components resident on the host systems;

a plurality of agent execution subsystems, each managing one or more of the plurality of network components on the host systems and each maintaining a representation of a component instance for each of the network components it manages for resolving host locations of the network components; and a mobile agent capable of processing across the computer network without explicit instructions therein to traverse the host systems on the computer network, whereby the network components are implicitly accessible to clients, through the representations in the agent execution subsystems.

12. The system of claim 11 wherein the network components comprise one or more object classes.

13. The system of claim 12 wherein the object classes comprise applets, servlets or Enterprise JavaBeans.

14. The system of claim 11 wherein the mobile agent is a script.

15. The system of claim 11 wherein each of the agent execution subsystems is incorporated into a web server.

16. A system for implementing distributed component programming in a computer network comprising:

a plurality of host systems, each including an agent execution subsystem, the agent execution subsystem comprising an agent hosting facility adapted to instantiate network components associated with the agent and to manage the receipt, from the agent, of a method invocation instruction associated with each of the network components; and a representation of each of the network components instances which are instantiated, whereby a host location of the network component is determined by resolving the previously instantiated network component to the host location in the representation and, if the host location is determined to be local, the method invocation is executed on the network component in the local host, else the agent is relocated to a remote host without maintaining any explicit relocation instructions therein for incorporation into an address space shared by the network component.

* * * * *